Feb. 10, 1948.  R. E. GRAY  2,435,649
AUTOMATIC PARACHUTE RELEASE
Filed May 1, 1946
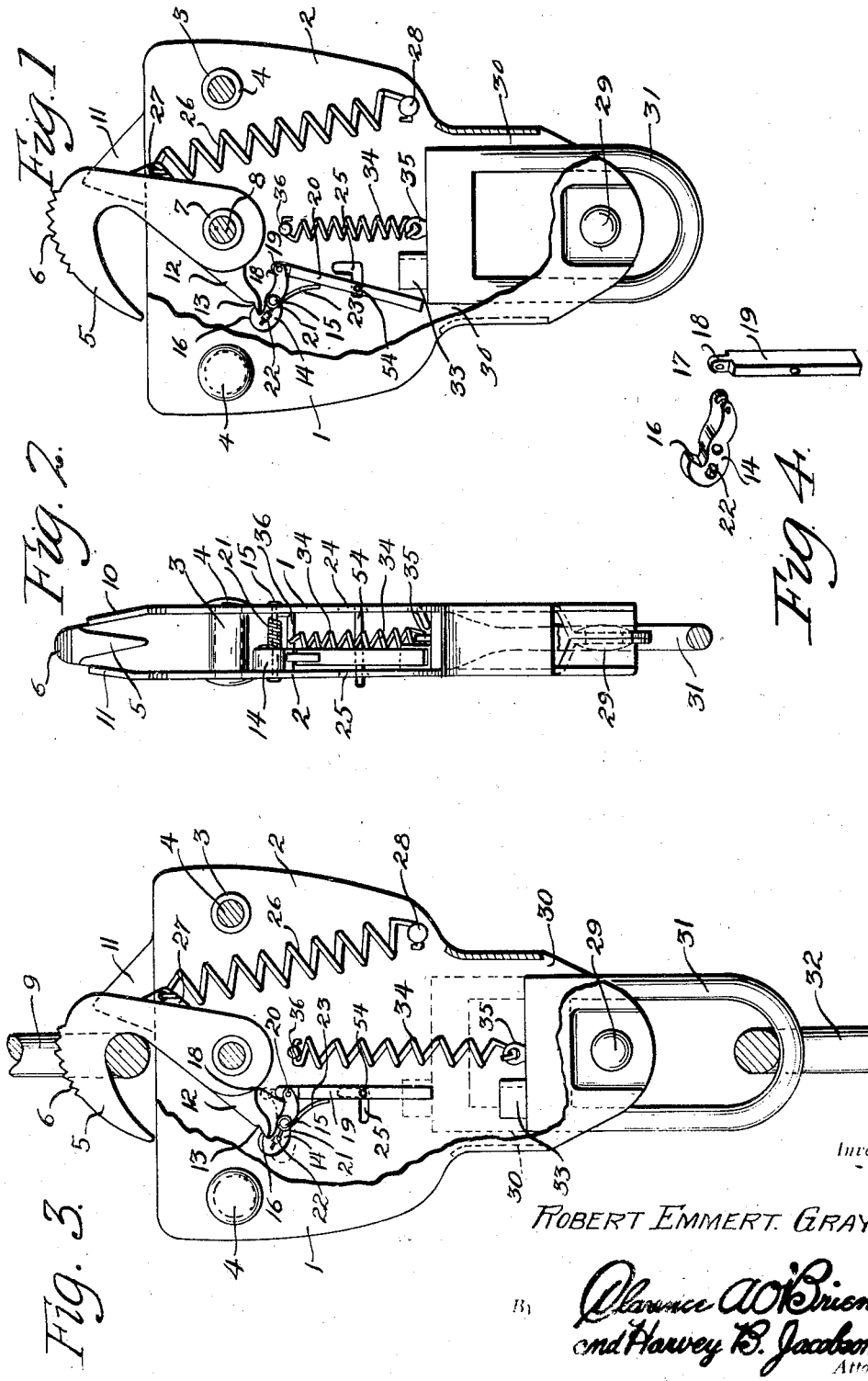
Inventor
ROBERT EMMERT GRAY Patented Feb. 10, 1948

2,435,649

UNITED STATES PATENT OFFICE 2,435,649

AUTOMATIC PARACHUTE RELEASE

Robert Emmert Gray, Tacoma, Wash., assignor of twenty-five per cent to Walter Augustus Gray, Jr., Tacoma, Wash.

Application May 1, 1946, Serial No. 666,480

8 Claims. (Cl. 294—83)

This invention relates to improvements in automatic release devices for parachutes.

An object of the invention is to provide an improved automatic parachute release mechanism whereby a load dropped by parachute from an airplane will be automatically released from the parachute upon touching the ground.

Another object of the invention is to provide an improved spring tensioned automatic hook device for positioning between a parachute and a load consisting of either a person or a load such as merchandise, whereby when the load is dropped by parachute from an airplane, the instant the load touches the ground, said hook device will release the load from the parachute to prevent dragging and injury or damage thereto.

A further object of the invention is to provide an improved automatic load releasing device for parachutes which will be highly efficient in operation, and relatively inexpensive to manufacture and produce.

Other objects will appear as the description proceeds.

In the accompanying drawings which form a part of this application,

Figure 1 is a side elevation of the automatic parachute release hook device showing the same in set position and with a portion of its housing being broken away to show the inner mechanism thereof;

Figure 2 is an end view of the hook device, and

Figure 3 is a side elevation of the automatic parachute release hook device with a portion of the housing being broken away to show the position of the inner mechanism in released position.

Like characters of reference are used throughout the following specification and the accompanying drawings to designate corresponding parts.

In carrying out the invention, there is provided a housing formed with oppositely disposed body members or plates 1 and 2, which are held spaced apart by means of the spacing collars or bushings 3, through which the bolts or rivets 4 extend.

A hook member 5 is formed on its upper portion or side with corrugations 6, adapted to be engaged by a thumb or finger of a hand when setting the device, and said hook being pivotally supported upon the bearing collar 7 on the cross bolt or rivet 8 extending between the body plates 1 and 2 adjacent their upper ends and midway of their sides, to permit said hook to engage with a ring or rings 9 of a parachute.

The upwardly and inwardly extending hook cleaning ears 10 and 11 are formed integrally with the side plates 1 and 2 on their upper ends, and are adapted to sweep the parachute ring or rings 9 from the hook 5 when the release mechanism is operated.

A depending lock arm 12 is formed on the lower or inner end of the hook 5 and terminates in the bearing surface 13.

The lock catch member 14 is pivotally mounted on pivot pin 15 extending between the side body plates 1 and 2, and is hooked shaped at one end to provide a bearing surface 16 for engagement with the bearing surface 13 on the lock arm 12 when the mechanism is in set position. The opposite end of the catch member 14 is formed to provide a yoke 17 whose ends are apertured to receive the reduced apertured upper end 18 of the lock catch trip arm 19, which is pivotally supported thereby on the pivot pin 20. A coil spring 21 is mounted about the pivot pin 15 and is secured at 22 to the lock catch member 14 and has its opposite end 23 in contact with the lock catch trip arm 19. A guide pin 54 is supported by the lock catch trip arm 19 and extends laterally through the angular opposed slots 24 and 25 in the side plates 1 and 2.

A tensioning coil spring 26 is secured at one end to an ear 27 formed on the rear surface of the hook member 5, and has its opposite end attached to a fixed lug 28 in said housing to exert a pull on said hook member towards its released position.

The lower central portion of the housing is pressed inwardly and secured together by the rivets 29 to provide oppositely disposed guide slots 30 in which the opposite sides of the shackle 31 are positioned for vertical movement. The lower end of the shackle 31 is adapted to support a link or hook 32, which in turn supports a load (not shown) being dropped by the parachute (also not shown). A block 33 is formed on the upper end of the shackle 31, while a coil spring 34 attached to an eye 35 on the upper end of the shackle will be secured at its opposite end to a pin 36 extending between the side plates 1 and 2 to exert an upward pull on said shackle.

In operation, the hook member 5 will be placed over the ring or rings 9 of a parachute, and the bearing surfaces 13 and 16 will be engaged with the lock catch trip arm 19 extending vertically as shown in Figure 1 of the drawings. The weight on the shackle 31 will pull the same downwardly against the tension of the spring 34 as the parachute with its load falls toward the ground. As soon as the load touches the ground, the spring 34 will retract the shackle 31 until the block 33 engages the lower end of the lock catch trip arm 19 thereby pushing upwardly on the same to force the guide pin 54 upwardly in the angular slots 24 and 25, by pushing up on the yoke end of the lock catch member 14 to pull down on its opposite end thereby separating the bearing surfaces 13 and 16 to permit the tension of the spring 26 to pull the hook member 5 downwardly until it is stopped by the bearing collar 7 on the bolt or nut 8. As the hook member 5 moves between the hook cleaning ears 10 and 11, the ring or rings 9 of the parachute will be positively wiped from said hook member, thereby releasing the release device and its load from the parachute.

From the foregoing description, it will be apparent that there has been devised a highly efficient form of automatic parachute release mechanism which will disengage a parachute from its load instantly upon the load contacting the ground.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. An automatic parachute release device including a body having spaced side plates, a parachute engaging hook pivotally supported between the upper ends thereof, opposed hook cleaning ears formed on the upper ends of said side plates, resilient means for retracting said hook, a slidable shackle in the lower end of said body, a lock catch member for holding said hook in set position, and a lock catch trip arm pivotally connected with said lock catch member.

2. An automatic parachute release device including a body having spaced side plates, a parachute engaging hook pivotally supported between the upper ends thereof, opposed hook cleaning ears formed on the upper ends of said side plates, resilient means for retracting said hook, a slidable shackle in the lower end of said body, a lock catch member for holding said hook in set position, and a slidable lock catch trip arm pivotally connected with said lock catch member.

3. An automatic parachute release device including a body having spaced side plates, a parachute engaging hook pivotally supported between the upper ends thereof, opposed hook cleaning ears formed on the upper ends of said side plates, resilient means for retracting said hook, a slidable shackle in the lower end of said body, a lock catch member for holding said hook in set position, a lock catch trip arm connected with said lock catch member, and guide means for said lock catch trip arm.

4. An automatic parachute release device including a body having spaced side plates, a parachute engaging hook pivotally supported between the upper ends thereof, opposed hook cleaning ears formed on the upper ends of said side plates, resilient means for retracting said hook, a slidable shackle in the lower end of said body, a lock catch member for holding said hook in set position, a lock catch trip arm connected with said lock catch member, guide means for said lock catch trip arm, and resilient tensioning means for holding said lock catch trip arm in set position.

5. The subject matter as claimed in claim 4, and a block on said shackle for engaging and releasing said lock catch trip arm to release said hook.

6. The subject matter as claimed in claim 4, a block on said shackle for engaging and releasing said lock catch trip arm to release said hook, and resilient means for retracting said shackle to engage and release said lock catch trip arm for releasing said hook.

7. The subject matter as claimed in claim 4, and said lock catch trip arm engaged with said lock catch member being vertically slidable for setting and releasing the parachute engaging hook.

8. The subject matter as claimed in claim 4, and a latch arm on said hook engageable with said lock catch member to hold said parachute engaging member in set position.

ROBERT EMMERT GRAY.

REFERENCES CITED

The following references are of record in the file of this patent:

FOREIGN PATENTS

| Number | Country | Date |
|---|---|---|
| 698,920 | France | Nov. 29, 1930 |